2 Sheets—Sheet 1.

J. B. CREIGHTON.

Car-Seat and Couch.

No. 602. Reissued Sept. 21, 1858.

N. PETERS, PHOTO-LITHOGRAPHER, WASHINGTON, D. C.

2 Sheets—Sheet 2.

J. B. CREIGHTON.

Car-Seat and Couch.

No. 602.

Reissued Sept. 21, 1858.

N. PETERS, PHOTO-LITHOGRAPHER, WASHINGTON, D. C.

UNITED STATES PATENT OFFICE.

J. B. CREIGHTON, OF TIFFIN, OHIO.

IMPROVEMENT IN RAILROAD-CARS FOR DAY AND NIGHT SERVICE.

Specification forming part of Letters Patent No. 20,254, dated May 18, 1858; Reissue No. 602, dated September 21, 1858.

*To all whom it may concern:*

Be it known that I, J. B. CREIGHTON, of Tiffin, in the county of Seneca and State of Ohio, have invented certain new and useful Improvements in Railroad-Car Seats for Day and Night Service; and I do hereby declare that the following is a full, clear, and exact description of the same, reference being had to the accompanying drawings, and to the letters of reference marked thereon.

The nature of my invention consists in the employment of movable backs for the purpose of filling the space between the seats for forming beds to lie upon at night, and also in forming beds and concealing them, when not in use, in the spaces between the windows, all of which will be hereinafter fully set forth.

Figure 1:
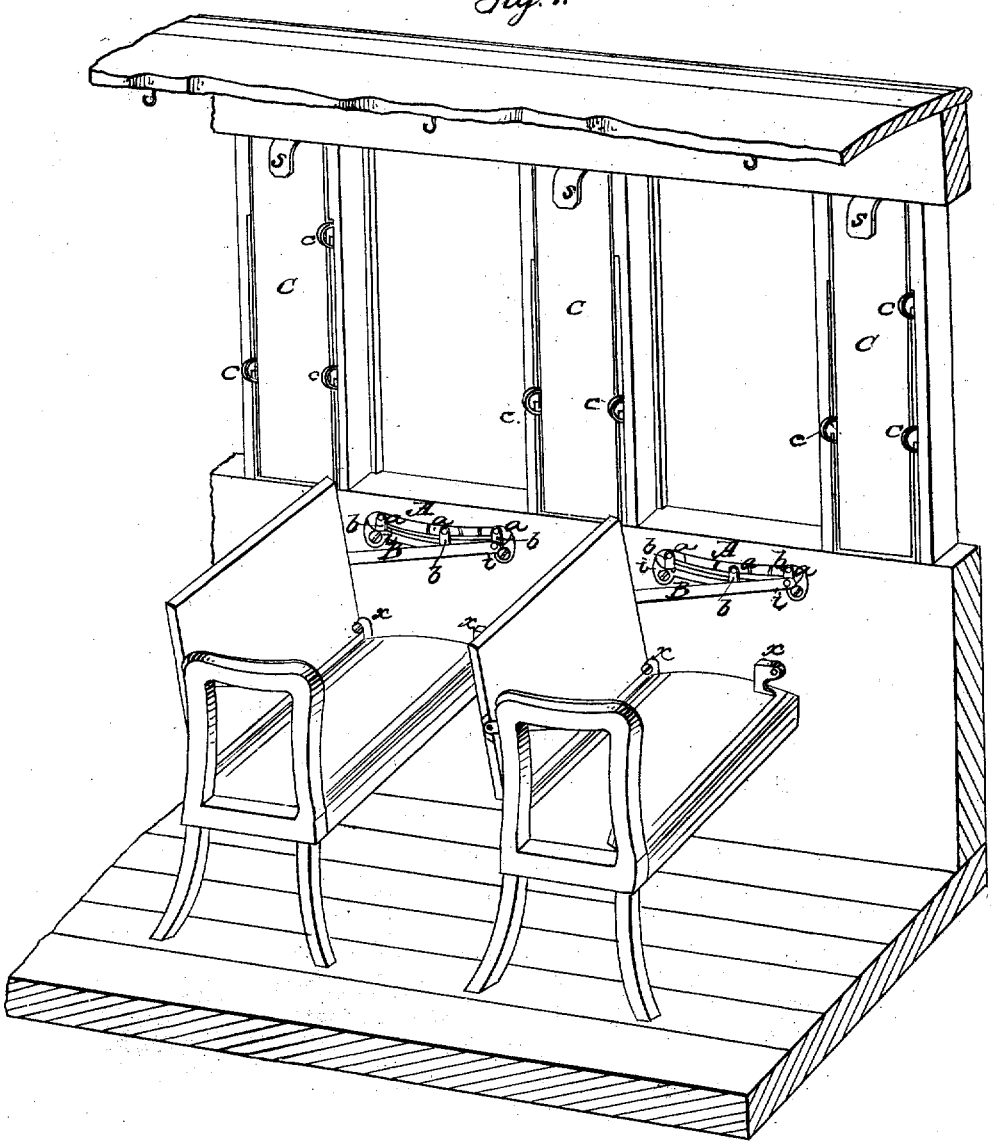
Figure 2:
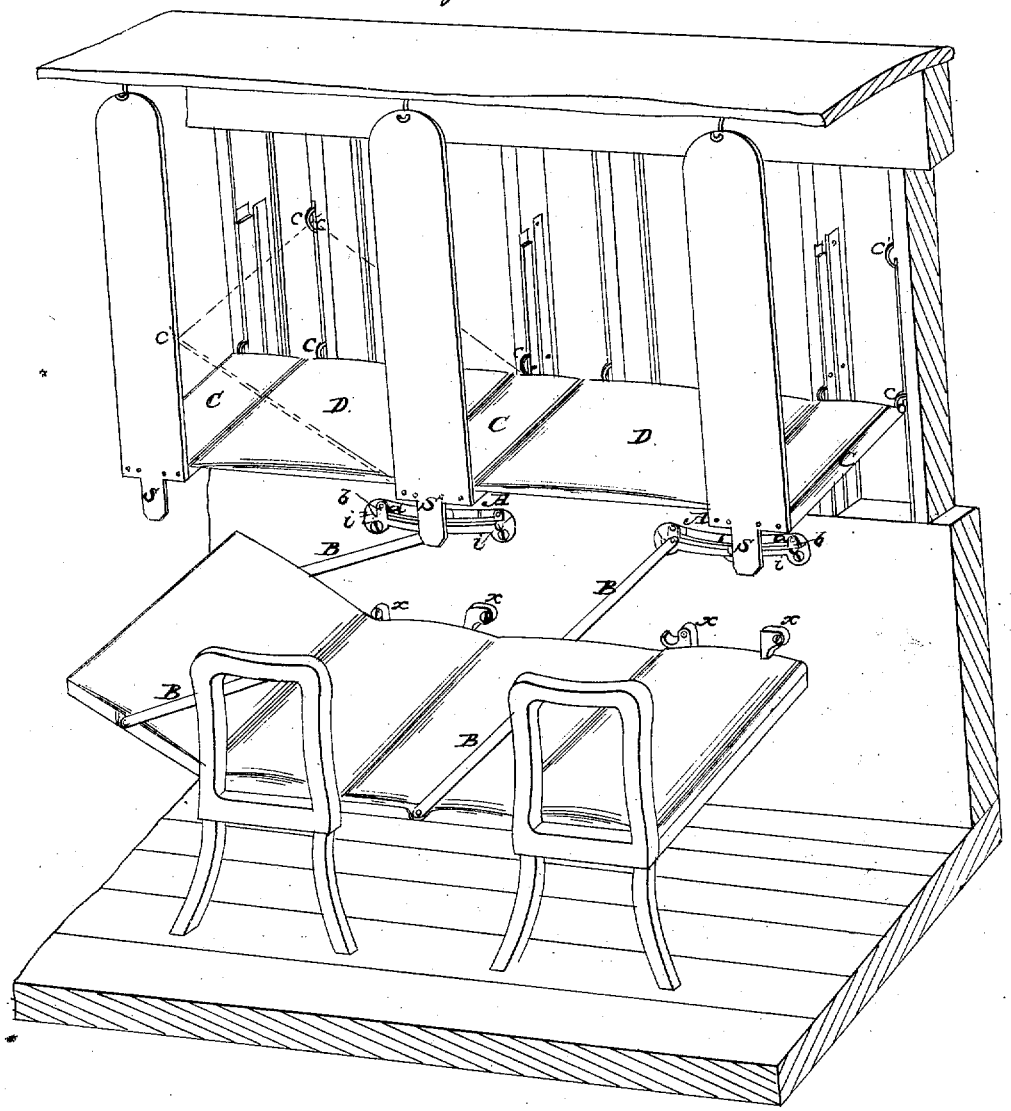

In the annexed drawings, making a part of this specification, Figure 1 is a perspective view of the arrangement complete for day service. Fig. 2 is a perspective view with the arrangement complete for night service.

In the several figures, M represents the car-seat. F F represent the reversible and movable backs of said seats. A A are slotted supporters, which are located on both sides of the seat. These supporters have three or more stops, (marked *i* in the drawings,) into which the supporting-pins of the stretchers B fall, said pins being retained in their places by means of eccentric drops *b*. Said drops move in depressions *a* upon the upper half of the supporters A, thus making the surfaces of both flush.

When the stretcher-pins rest in the stops *i* at either end of the supporters A, the back of the seats will be either erect or horizontal; but resting in the central one the backs will be elevated at an angle for the purpose of a head-rest. When the back is in an erect or inclined position, it rests upon the reversible hooks *x*. In Fig. 2 it will be seen that one of the backs is let down in position to fill up the space between two seats, and that another back is let partially down, so that it may form a head-rest or pillow for a person lying down upon the bed made by the seats and other back. Should all the seats in any one car be arranged as are shown in Fig. 2, the passengers may lie down, and a space will be left under the back which forms a pillow for them to place their feet; but should this be unpleasant, as it frequently is, for the feet of one to be in such close proximity to the nose of another, the backs may be so adjusted that their heads will come together, instead of feet to head; but this travelers can arrange to suit themselves.

I may use the supporters, the stretchers, the pins, and the stops in the manner herein shown, or I may employ different means for arriving at the same result, of filling the spaces between the seats by means of the backs, as this I consider one of the chief features of my invention, the means used for its accomplishment being all substantially the same.

The material for the upper tier of beds is contained in boxes formed by the spaces between the windows, the canvas D and suspenders S being concealed behind the cushioned trap-board C.

To form the beds, the traps C are raised in perpendicular slots to resting-places *c*, one end of the suspender S being hooked to the ceiling of the car. The canvas D is then stretched from trap C to trap C, every alternate one raised to *c'*, as represented in dotted lines as seen in Fig. 2.

Having thus fully described my invention, what I claim as new, and desire to secure by Letters Patent, is—

1. The employment of the movable backs of car-seats, when used for the purpose of filling up the spaces between the seats so that a bed may be formed, and this I claim whether accomplished in the manner herein shown or in any other manner substantially the same, whereby the same result is accomplished.

2. The within-described method of forming and concealing, when not in use, in the spaces between the windows, an upper tier of beds, as set forth, and for the purpose specified, and also the same in arrangement with the device constituting the subject of the first claim.

J. B. CREIGHTON.

Witnesses:

C. M. ALEXANDER,

JOHN S. HOLLINGSHEAD.